United States Patent [19]
Son

[11] Patent Number: 5,825,584
[45] Date of Patent: Oct. 20, 1998

[54] TAPE CASSETTE LOADING DEVICE IN TAPE RECORDER FOR SMOOTHLY INSERTING TAPE CASSETTE INTO HOLDER

[75] Inventor: Byung-Sam Son, Suwon, Rep. of Korea

[73] Assignee: Samsung Electronics Co., Ltd., Kyungki-Do, Rep. of Korea

[21] Appl. No.: 714,326

[22] Filed: Sep. 18, 1996

[30] Foreign Application Priority Data

Nov. 2, 1995 [KR] Rep. of Korea ................... 1995-39451

[51] Int. Cl.⁶ ................................................ G11B 15/00
[52] U.S. Cl. ............................................................. 360/96.5
[58] Field of Search ................................ 360/96.5, 96.6; 242/347, 347.1

[56] References Cited

U.S. PATENT DOCUMENTS 5,402,405  3/1995  Shiomi ....................................... 360/94

FOREIGN PATENT DOCUMENTS 0 349 329   1/1990  European Pat. Off. .............. 360/96.5
59-180847  10/1984  Japan .................................... 360/96.5

Primary Examiner—Stuart S. Levy
Assistant Examiner—David D. Davis
Attorney, Agent, or Firm—Sughrue, Mion, Zinn, Macpeak & Seas, PLLC

[57] ABSTRACT

A tape cassette loading device in a tape recorder has an improved structure for smooth insertion of a cassette without resistance from a plate spring. The loading device includes plate spring members fixed at left and right sides of a holder, and a chassis installed on the upper part of the holder and having cam portions engaged with the plate spring members. When the holder is at an inserting position of the cassette, the plate spring members do not engage with the cam portions. Therefore, when the cassette is initially inserted into the holder, the cassette can be inserted into the holder without any resistance from the plate spring members.

2 Claims, 6 Drawing Sheets

TAPE CASSETTE LOADING DEVICE IN TAPE RECORDER FOR SMOOTHLY INSERTING TAPE CASSETTE INTO HOLDER

BACKGROUND OF THE INVENTION

The present invention relates to a tape cassette loading device in a tape recorder and, more particularly, to a tape cassette loading device in a tape recorder having an improved structure for smooth insertion of a tape cassette into a holder without resistance from a spring member.

A general tape recorder, such as a VCR or a camcorder, employs a holder for receiving and loading a tape cassette. This holder moves the tape cassette from an inserting position onto reel tables by being moved via a predetermined loading device.

FIGS. 1 and 2 show essential parts of a loading mechanism utilized in a VCR in which reference numeral 100 denotes a deck member having a head drum 10, reel tables (not shown), and tape guiding mechanisms (not shown) installed thereon. Guide brackets 120 and 130 are installed on each side of the deck member 100. The guide brackets 120 and 130 have guide slots 121 & 122 and 131 & 132, respectively, each having horizontal and vertical portions, formed thereon. Guide pins 111 & 112 and 113 & 114 are provided for slidably coupling to the respective guide slots 121 & 122 and 131 & 132 at either side of the holder 110 for receiving a tape cassette. Plate springs 170 and 171 for pressing down on the upper surface of the tape cassette are attached to the sides of the holder 110. A pair of loading arms 140 and 150 for moving the holder 110 along the guide slots 121 & 122 and 131 & 132 are provided at the inner sides of the guide brackets 120 and 130. The loading arms 140 and 150, which are connected to each other by a shaft 160, are rotatably installed on the respective guide brackets 120 and 130.

Guide grooves 142 and 152 with which the guide pins 112 and 114 on the holder 110 are slidably combined are formed in the loading arms 140 and 150, and torsion springs 143 and 153 are mounted adjacent to the guide grooves 142 and 152 to elastically contact the guide pins 112 and 114. As shown in FIGS. 2 and 3, a gear portion 144 is formed on one loading arm 140. A moving member 180 having a rack gear portion 182 is movably installed on the deck member 100. The movement of the moving member 180 is powered by a loading motor (not shown) and the gear portion 182 engages with the gear portion 144. Reference numeral 185 denotes a rack gear portion which connects to the loading motor.

The loading device having the construction described above operates as follows. First, a tape cassette which is placed into the holder 110 is pressed down by the plate spring 170 for stability within the holder 110. Next, the moving member 180 is moved by the driving of the loading motor so that the loading arms 140 and 150 interlocked with the moving member 180 rotate. By the rotation of the loading arms 140 and 150, the holder 110 is moved to a tape cassette seating position along the guide slots 121 & 122 and 131 & 132.

Referring to FIGS. 2 and 3, the holder 110 is elastically biased downward by the torsion springs 143 and 153 pressing down on the pins 112 and 114 to stably seat the tape cassette on the reel tables. However, when a tape cassette is initially inserted into the holder 110, resistance from the plate spring 170 requires the user to provide an insertion force which is inconvenient and unreliable.

SUMMARY OF THE INVENTION

To solve the above problems, it is an object of the present invention to provide a tape cassette loading device in a tape recorder in which a tape cassette can be inserted into a holder without resistance from a plate spring while the plate spring provides stability during loading.

To accomplish the above object, there is provided a tape cassette loading device in a tape recorder, comprising: a deck on which reel tables for seating a tape cassette thereon are installed; a holder for receiving the tape cassette, said holder having sidewalls; a guide bracket which guides the holder from a tape cassette inserting position to a seating position; means for slidably moving the holder along the guide bracket; and means for elastically biasing the tape cassette toward one side of the holder for stability of the tape cassette within the holder as the holder is moved, wherein the elastic biasing means includes plate spring members having a portion which is fixed to said sidewall of the holder, and a chassis fixedly installed on the guide bracket and having cam portions in a predetermined shape formed thereon, and wherein the plate spring members are not engaged with the cam portions when the holder is at the tape cassette inserting position, and the plate spring members are engaged with the cam portions to press down on an upper surface of the tape cassette when the holder is moved to the seating position by the moving means.

The free ends of the plate spring members fold upward, and the cam portions are formed toward the plate spring members from the chassis and have slanted and horizontal portions.

According to the present invention, the plate spring member does not engage with the cam portion when the holder is at a tape cassette inserting position. Thus, the plate spring member does not apply pressure to the upper surface of a cassette when the cassette is initially inserted into the holder. When the holder is moved to a tape cassette seating position by the moving means, the edge portion of the plate spring member presses down on the upper surface of the cassette by engaging with the cam portion. As described above, the loading device according to the present invention can insert the tape cassette into the holder without resistance from the plate spring member.

BRIEF DESCRIPTION OF THE DRAWINGS

The above object and advantages of the present invention will become more apparent by describing in detail a preferred embodiment thereof with reference to the accompanying drawings, in which.

DETAILED DESCRIPTION OF THE INVENTION

Figure 4:
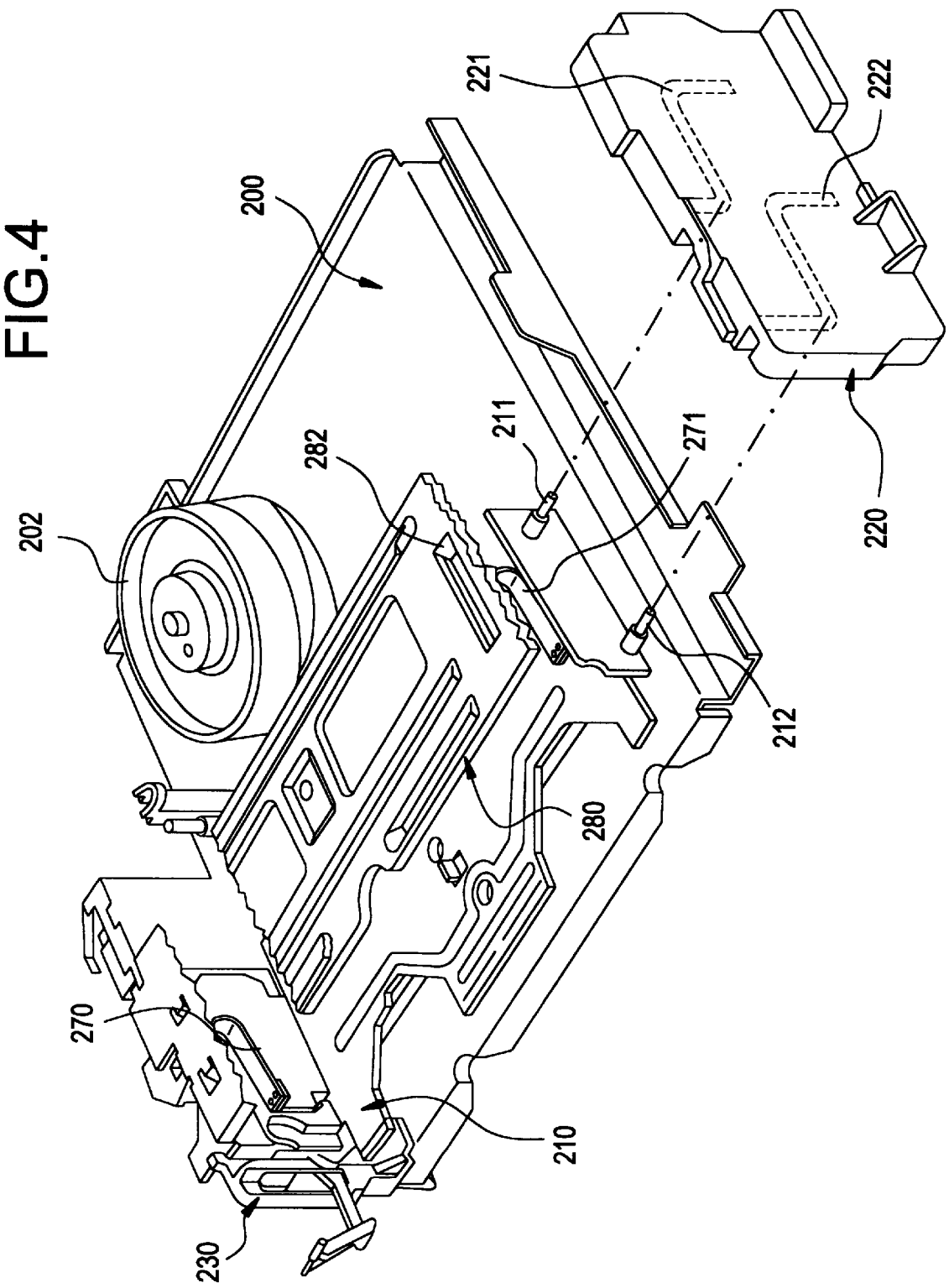
FIG. 4 is a partially exploded perspective view showing the essential parts of a tape recorder adopting a loading device according to the present invention.
Figure 5:
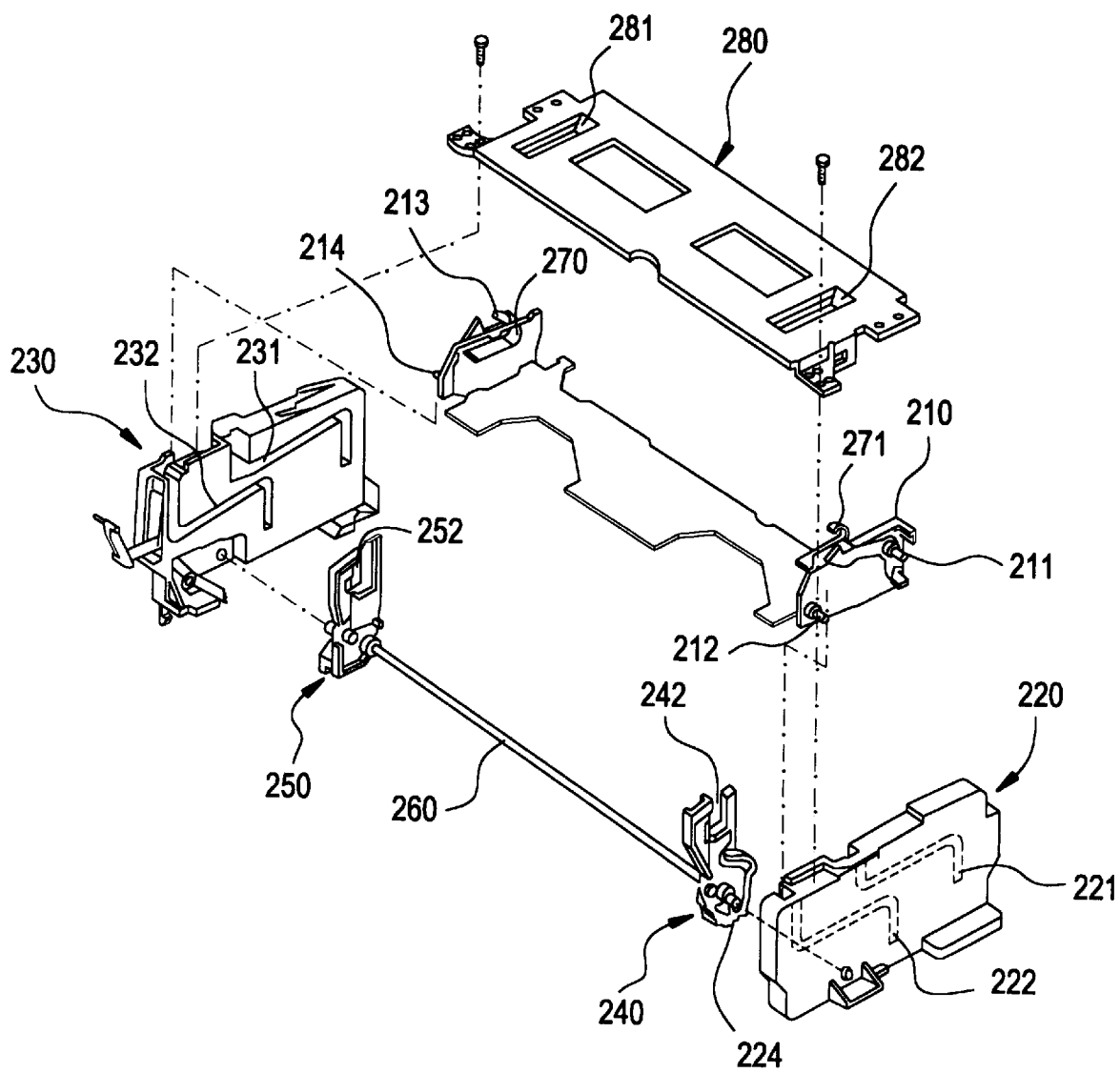
FIG. 5 is an exploded perspective view of the essential parts shown in FIG. 4.

Referring to FIGS. 4 and 5, reference numeral 200 denotes a deck member on which a head drum 202, reel tables (not shown) and tape guide rollers (not shown) are mounted. Reference numeral 210 denotes a holder for receiving a tape cassette 300 (refer to FIG. 6). The holder 210 is guided from an insertion position to the reel tables by a predetermined guiding means, and can be moved by a predetermined moving means.

The guiding means is comprised of guide brackets 220 and 230 installed at each side of the deck member 200; guide slots 221 & 222 and 231 & 232, each having horizontal and vertical portions, formed in guide brackets 220 and 230, respectively; and guide pins 211 & 212 and 213 & 214 slidably coupled to the respective guide slots 221 & 222 and 231 & 232 provided on both sides of the holder 210. Thus, the holder 210 moves vertically and horizontally along the guide slots 221 & 222 and 231 & 232 formed on the respective guide brackets 220 and 230.

Figure 1:
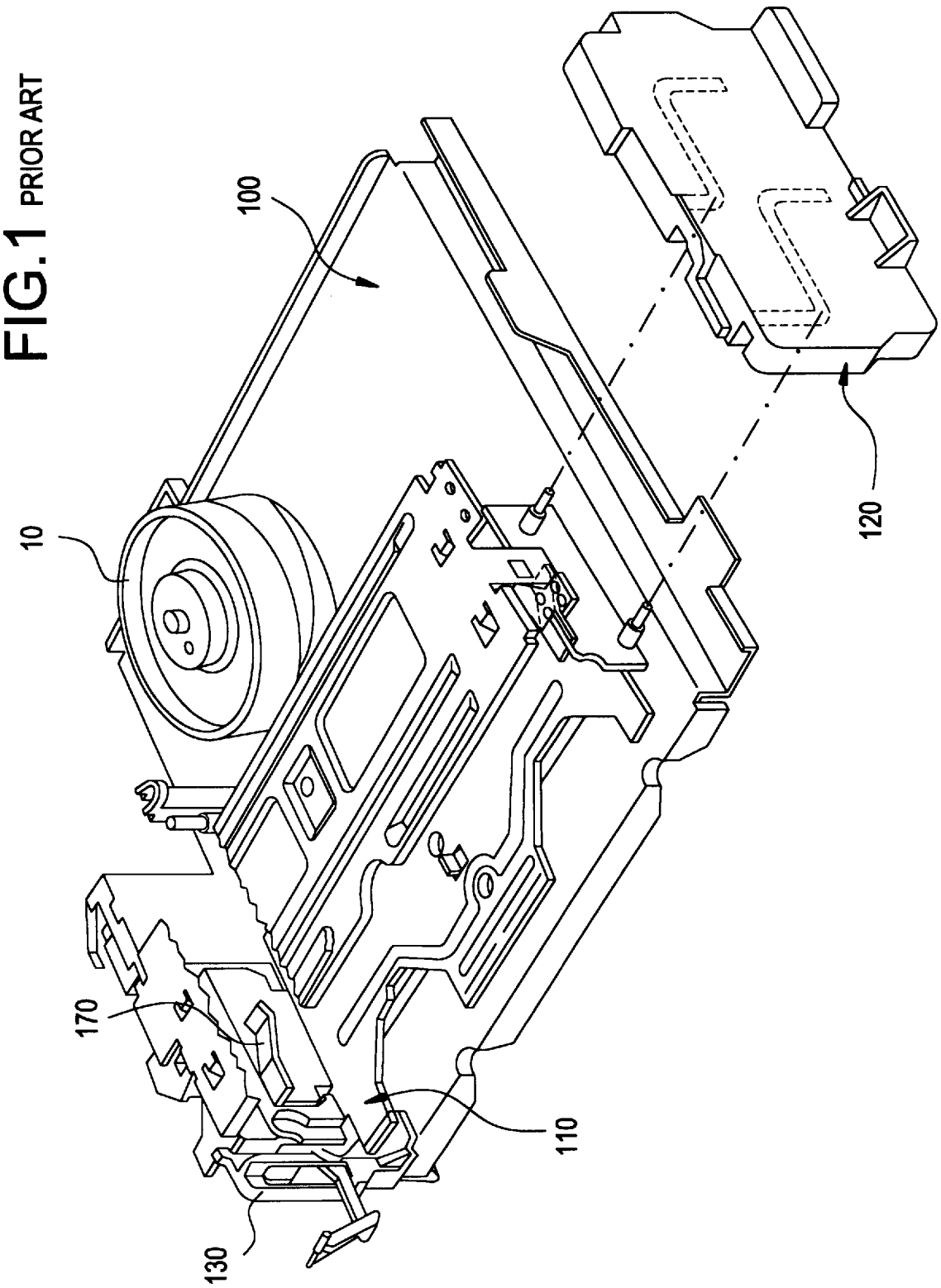
FIG. 1 is a perspective view showing the essential parts of a tape recorder adopting a previously proposed loading device.
Figure 2:
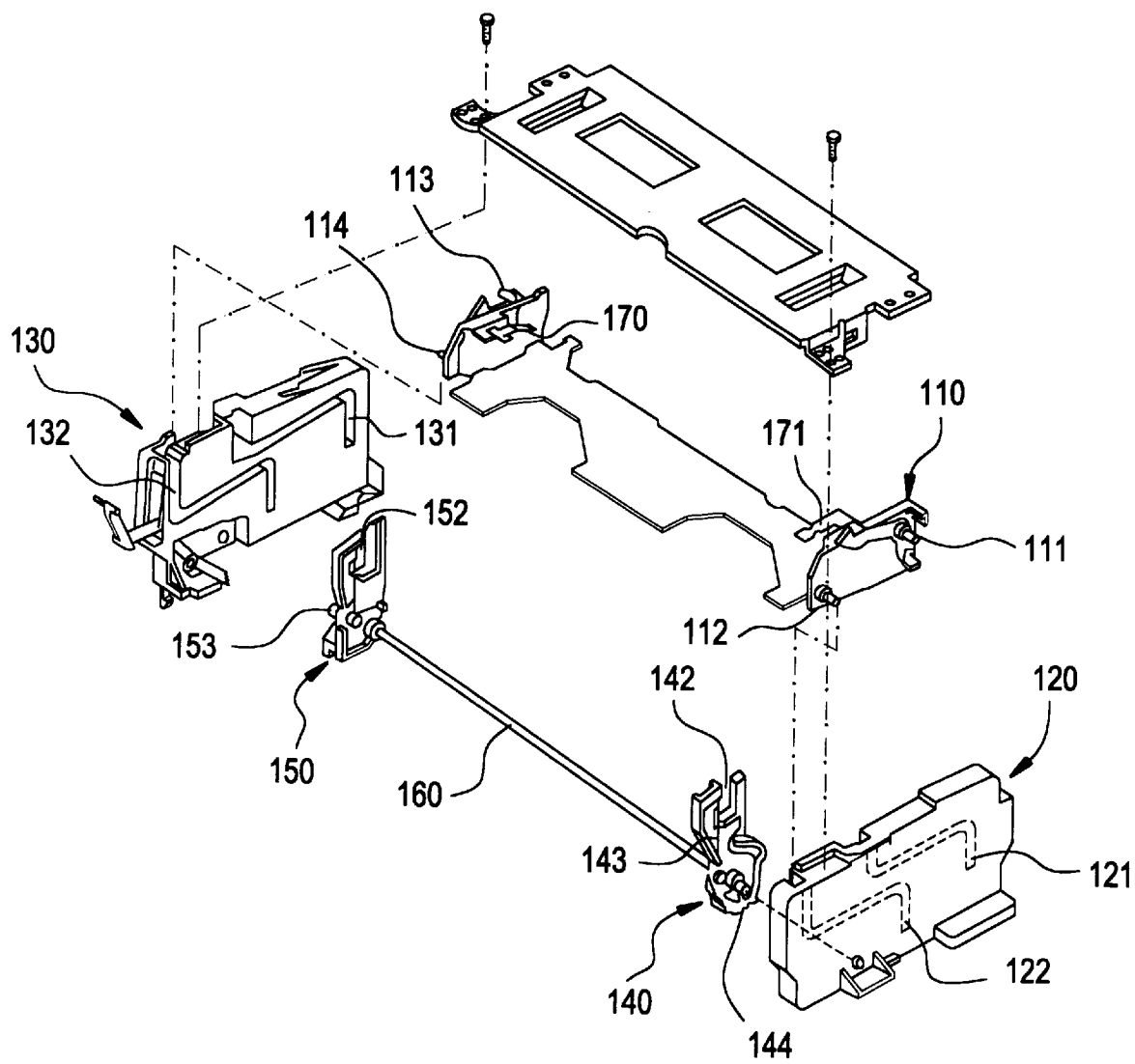
FIG. 2 is an exploded perspective view of the essential parts shown in FIG. 1.
Figure 3:
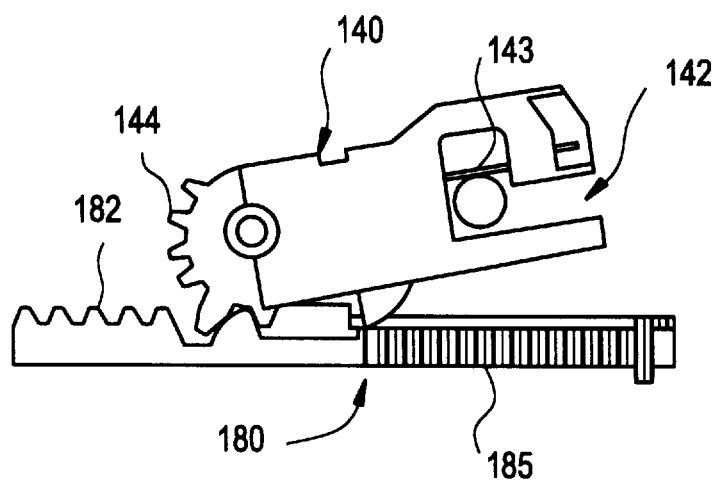
FIG. 3 shows the loading arm action in the previously proposed loading device.

The moving means for moving the holder 210 is substantially the same as that of the previously proposed loading device, and will be briefly described as follows. One loading arm 240, having a guide groove 242 slidably combined with the guide pin 212 and a gear portion 244 formed thereon, is rotatably coupled to the guide bracket 220. The other loading arm 250 on which a guide groove 252, which is combined with the guide pin 214 on the holder 210, is formed is rotatably coupled to the guide bracket 230. The pair of loading arms 240 and 250 are connected to each other via a shaft 260. Accordingly, if the gear portion 244 of the loading arm 240 engages with a moving member (see numeral 180 in FIG. 3) which is moved horizontally by a predetermined driving source (not shown), and then rotates, the holder 210 moves along the guide slots 221, 222 and 231, 232 on the guide brackets 220 and 230, respectively.

Figure 6:
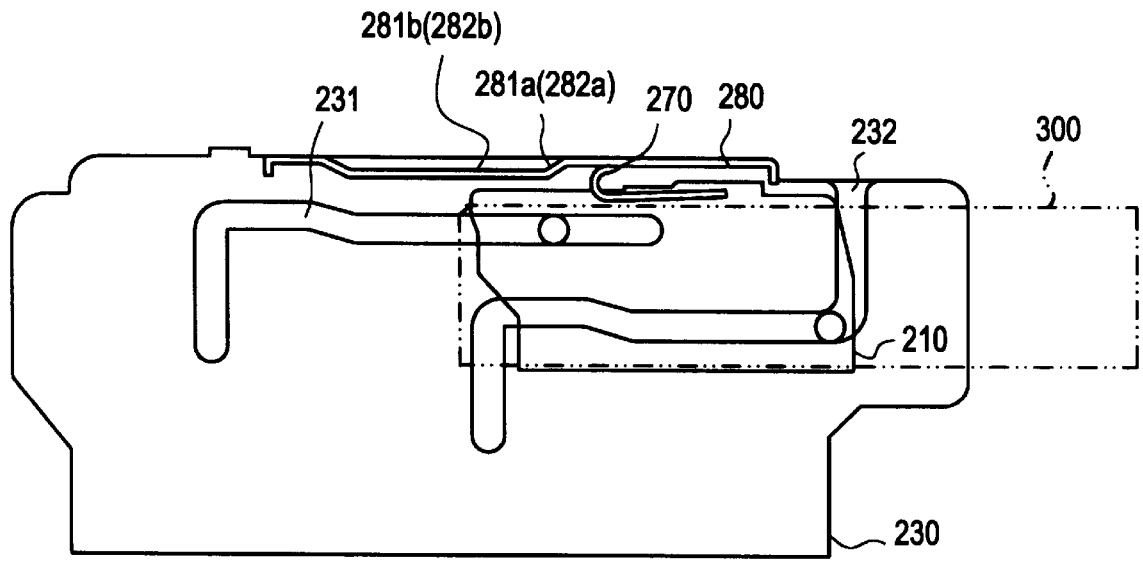
FIGS. 6 and 7 show the action of the loading device according to the present invention.
Figure 7:
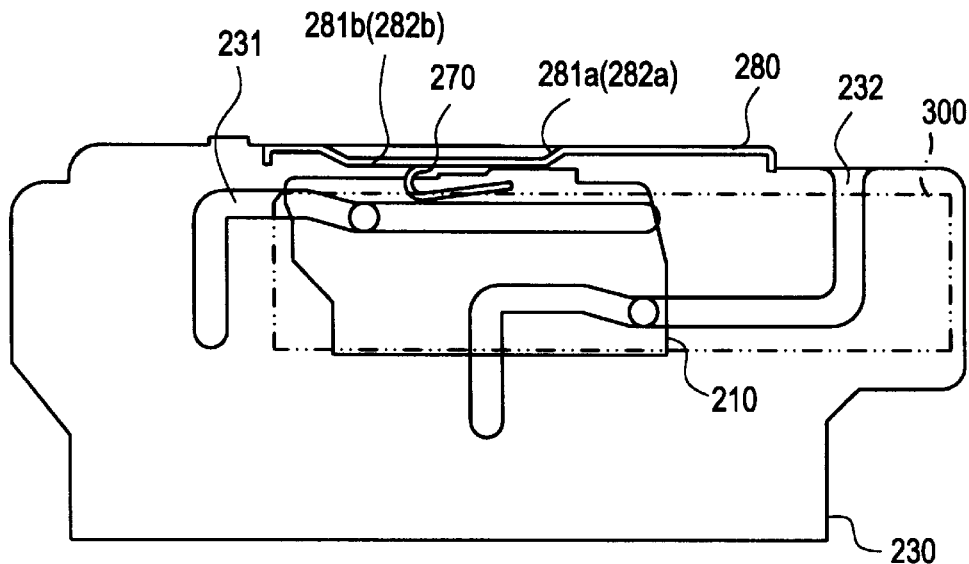

An elastic biasing means is provided for stabilizing the tape cassette 300 by pressing down on the tape cassette 300 when the tape cassette 300 is received in the holder 210 and when the tape cassette 300 is seated on the reel tables. The elastic biasing means, as shown in FIGS. 4 and 5, includes plate spring members 270 and 271, one side of each of the plate spring members 270 and 271 being fixed inside a corresponding sidewall of the holder 210, and a chassis 280 having cam portions 281 and 282 with a predetermined shape formed thereon and fixedly installed on the guide brackets 220 and 230. When the holder 210 is at the inserting position of the tape cassette 300 as shown in FIG. 6, the plate spring members 270 and 271 do not interact with the cam portions 281 and 282, thus the plate spring members 270 and 271 do not apply pressure to the upper surface of the tape cassette 300. On the other hand, when the holder 210 is moved by the moving means as shown in FIG. 7, the elastic biasing means operates so that the plate spring members 270 and 271 press down on the upper surface of the tape cassette 300 by being in contact with the cam portions 281 and 282.

The free ends of plate spring members 270 and 271 point upward. The cam portions 281 and 282 are formed by lancing the chassis 280 downward, and have respective slanted portions 281a and 282a and horizontal portions 281b and 282b as shown in FIGS. 6 and 7.

The thus-constructed tape cassette loading device according to the present invention operates as follows.

As shown in FIG. 6, when the holder 210 is at the inserting position, the plate spring members 270 and 271 remain apart from the cam portions 281 and 282. Thus, since the tape cassette 300 remains out of contact with the plate spring members 270 and 271, it is inserted into the holder 210 without any resistance. With the tape cassette 300 inserted into the holder 210, when the holder 210 moves to the seating position by the moving means, the end portions of the plate spring members 270 and 271 installed on the holder 210 are deformed downward by making contact with the slanted and horizontal portions 281a & 282a and 281b & 282b of the cam portions 281 and 282. At this time, the plate spring members 270 and 271 press down on the upper surface of the tape cassette 300 for stably keeping the tape cassette within the holder 210.

As described above, in the tape cassette loading device in a tape recorder according to the present invention, the tape cassette 300 is smoothly inserted into the holder 210 without resistance from the plate spring members.

It is contemplated that numerous modifications may be made to the tape cassette loading device of the present invention without departing from the spirit and scope of the invention as defined in the -following claims.

What is claimed is:

1. A tape cassette loading device in a tape recorder, comprising:

a deck on which reel tables for seating a tape cassette thereon are installed;

a holder for receiving the tape cassette, said holder having sidewalls;

a guide bracket which guides said holder from a tape cassette inserting position to a seating position;

means for slidably moving said holder along said guide bracket; and means for elastically biasing the tape cassette toward one side of said holder for stability of the tape cassette within said holder as said holder is moved, wherein said elastic biasing means includes plate spring members having a portion which is fixed to said sidewall of said holder, and a chassis fixedly installed on said guide bracket and having cam portions in a predetermined shape formed thereon, and wherein said plate spring members are not engaged with said cam portions when said holder is at the tape cassette inserting position, and said plate spring members are engaged with said cam portions to press down on an upper surface of the tape cassette when said holder is moved to the seating position by said moving means.

2. The tape cassette loading device in a tape recorder as claimed in claim 1, wherein said plate spring members further include free ends which fold upwardly, and said cam portions are formed so as to project toward said plate spring members from said chassis and have a slanted portion and a horizontal portion.

* * * * *